United States Patent [19]

Dow et al.

[11] 4,421,118
[45] Dec. 20, 1983

[54] ULTRASONIC TRANSDUCER

[75] Inventors: Julian Dow, Mountain View; Paul F. Meyers, Sunnyvale, both of Calif.

[73] Assignee: SmithKline Instruments, Inc., Sunnyvale, Calif.

[21] Appl. No.: 292,053

[22] Filed: Aug. 12, 1981

[51] Int. Cl.³ .............................................. A61B 10/00
[52] U.S. Cl. ...................................... 128/660; 310/15
[58] Field of Search ................ 128/660, 661, 618–620; 310/13–15, 17, 20, 22–24

[56] References Cited

U.S. PATENT DOCUMENTS

| | | | |
|---|---|---|---|
| 2,628,319 | 2/1953 | Vang | 310/15 |
| 3,076,153 | 1/1963 | Rieckman et al. | 310/22 X |
| 3,491,279 | 1/1970 | Rodaway | 310/15 X |
| 4,130,022 | 12/1978 | Goodrich et al. | 128/660 X |
| 4,185,501 | 1/1980 | Proudian et al. | 128/660 X |
| 4,233,988 | 11/1980 | Dick et al. | 128/660 |
| 4,259,653 | 3/1981 | McGonigal | 310/15 X |

*Primary Examiner*—William E. Kamm
*Assistant Examiner*—Francis J. Jaworski

[57] ABSTRACT

An ultrasonic transducer is disclosed comprising a transducer head assembly containing a movable crystal holder containing a crystal which is coupled to a stationary base by mechanical linkage means. A motor adapted to provide linear reciprocating motion is coupled to the mechanical linkage means for causing the crystal holder and crystal, when driven by the motor, to undergo reciprocating swinging motion for transmitting ultrasonic energy to and receiving echo signals from an object in front of the transducer in a sector scanning manner.

12 Claims, 9 Drawing Figures

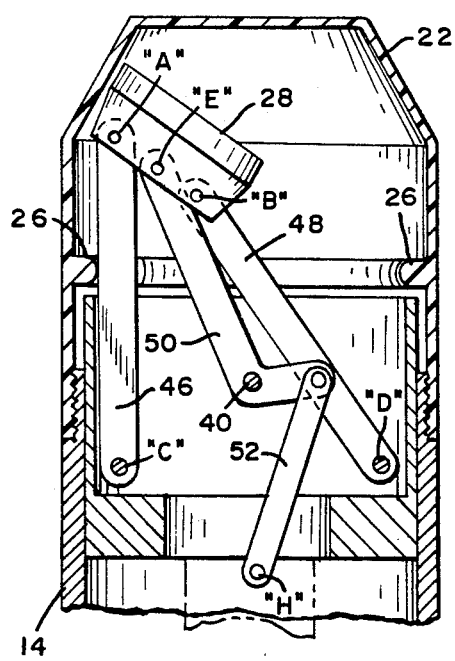
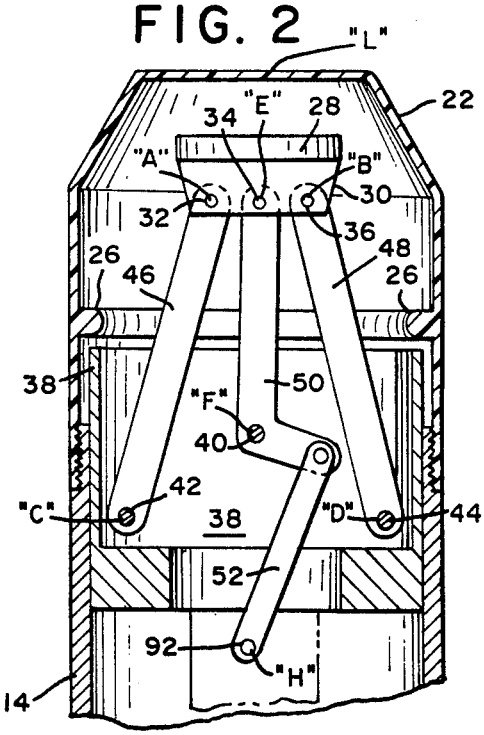
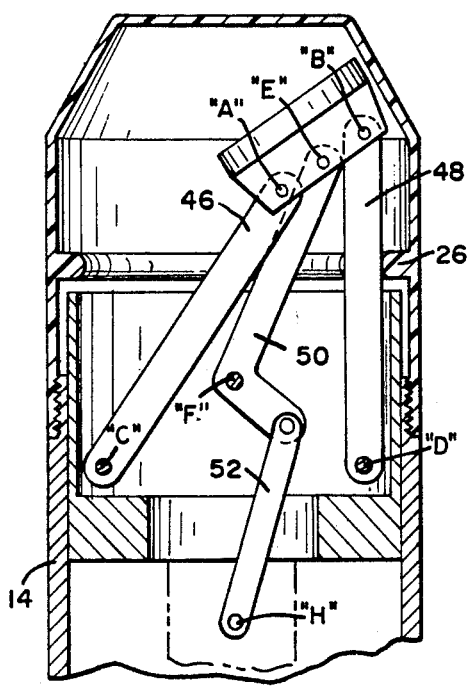
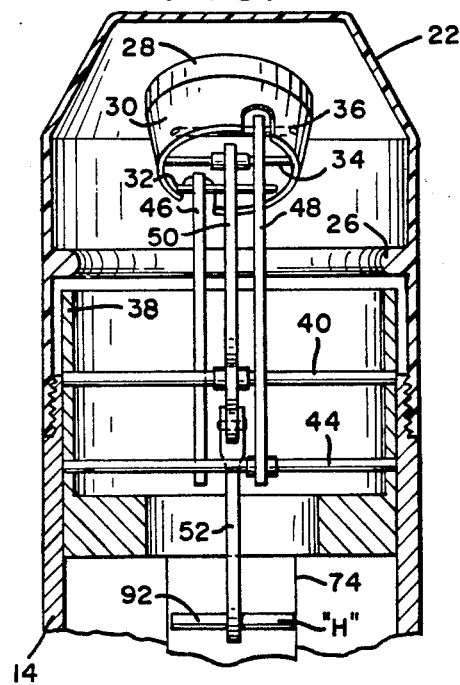

ULTRASONIC TRANSDUCER

BRIEF SUMMARY OF THE INVENTION

This invention concerns an ultrasonic transducer probe assembly for use with a real-time ultrasound diagnostic scanner and, more specifically, refers to a novel transducer probe head assembly comprising a four-bar linkage drive mechanism and a linear reciprocating motor for driving the transducer probe head.

In the field of ultrasonic diagnostics it is necessary to obtain acoustic images of body tissue. The field of ultrasonic cardiology presents unique problems in that the heart is partially obscured from the ultrasound search and echo signals by costal cartilage and ribs. Therefore, when using the well known sector scan developed for cardiology, it is usually desirable that a transducer probe be used which exhibits a point of rotation of the ultrasound search signal beams (i.e., the region of intersection of the search beams) in front of the transducer probe itself, in the intercostal region.

In medical ultrasound diagnosis it is desirable to use a probe which is physically small in size. Small size allows the user to image at certain body portions with greater ease and reduces user fatigue which occurs with the use of large probes.

Transducer probes used in sector scan ultrasound diagnostic scanners generally are of two types: a multi-element rotating head transducer, such as has been disclosed in U.S. Pat. No. 4,149,419, issued to R. Connell et al., entitled "Ultrasonic Transducer Probe," dated Apr. 17, 1979, or a pivotally mounted head undergoing oscillatory motion, such as has been disclosed in U.S. Pat. No. 3,955,561 issued to R. Eggleton, entitled "Cardioscan Probe," dated May 17, 1976.

In the multi-element rotating transducer probe the alignment of each piezoelectric element is critical since three or four elements will be used successively to scan the particular organ. Unless the elements are precisely aligned, the images produced on the cathode ray tube screen will jump or be misaligned as the different elements are activated successively when each element assumes its position opposite the organ, i.e. the heart. The single element probe overcomes this disadvantage.

An advantage of the present transducer construction resides in the fact that the probe is able to transmit ultrasonic signals at a controllable scanning velocity and at an adjustable scan angle. These advantages are not found in probes which are driven by a rotating motor without the addition of complex and expensive control circuits.

A disadvantage of the prior art pivotally mounted probe constructions resides in the inclusion of a rotating motor within the probe head. The rotating motor and the pivotal motion create vibrations whch can be discomforting to the patient. The linkage and linear reciprocating motor construction disclosed hereafter obviates this disadvantage.

In the present probe construction, a compact transducer probe is described which uses a four-bar linkage mechanism to move the transmit-receive transducer crystal through a sector scan angle of up to 90 degrees. A linear reciprocating motor coupled to the transducer crystal by means of a crank and drive bar provides the force necessary for the crystal to undergo the scanning motion. By suitably dimensioning the four-bar linkage, the focal point of the scanning beams is located in front of the probe, in the intercostal region, as the crystal undergoes swinging motion.

The motor comprises a stack of magnets, each magnet being separating from an adjoining magnet by a steel spacer. The magnets are disposed with the same magnetic poles facing each other. Surrounding the stack of magnets is a tubular coil form having a plurality of electrical coils disposed thereon in a manner to cause a respective coil to be located opposite a respective spacer. Adjacent serially connected coils are oppositely wound. When current passes through the coils, a return flux path through the magnets pushes adjacent coils in the same direction, thereby causing the coil form to move with a force equivalent to the sum of the force of the plurality of coils. By supplying an alternating current signal, the coils undergo a linear reciprocating motion. The tubular coil form is coupled to a crank for causing the transducer crystal to undergo almost circular swinging motion.

A principal object of this invention is, therefore, the provision of a novel transducer probe for use in a sector scan ultrasound diagnostic scanner.

Another object of the present invention is the provision of a four-bar linkage assembly for driving a crystal in a transducer probe head.

A still further object of this invention is the provision of an improved motor assembly for driving a transducer probe head assembly.

Further and still other objects of this invention will become more clearly apparent when the following specification is read in conjunction with the accompanying drawings.

BRIEF DESCRIPTION OF THE DRAWINGS

FIG. 2 is an elevational sectional view of the transducer probe head with the transducer crystal in its central position;

FIG. 3 is a view similar to FIG. 2 with the transducer crystal at one extreme end of the scan position;

FIG. 4 is a view similar to FIG. 3 with the transducer crystal at the other extreme end of the scan position;

FIG. 5 is a side elevational view, partly in section, of the transducer with the crystal at one end of its scan position;

FIG. 8 is a view, partly in section, of the transducer probe head and motor coupled together, and FIG. 9 is a schematic diagram showing the magnetic fields created in the motor.

DETAILED DESCRIPTION OF THE INVENTION

Figure 1:
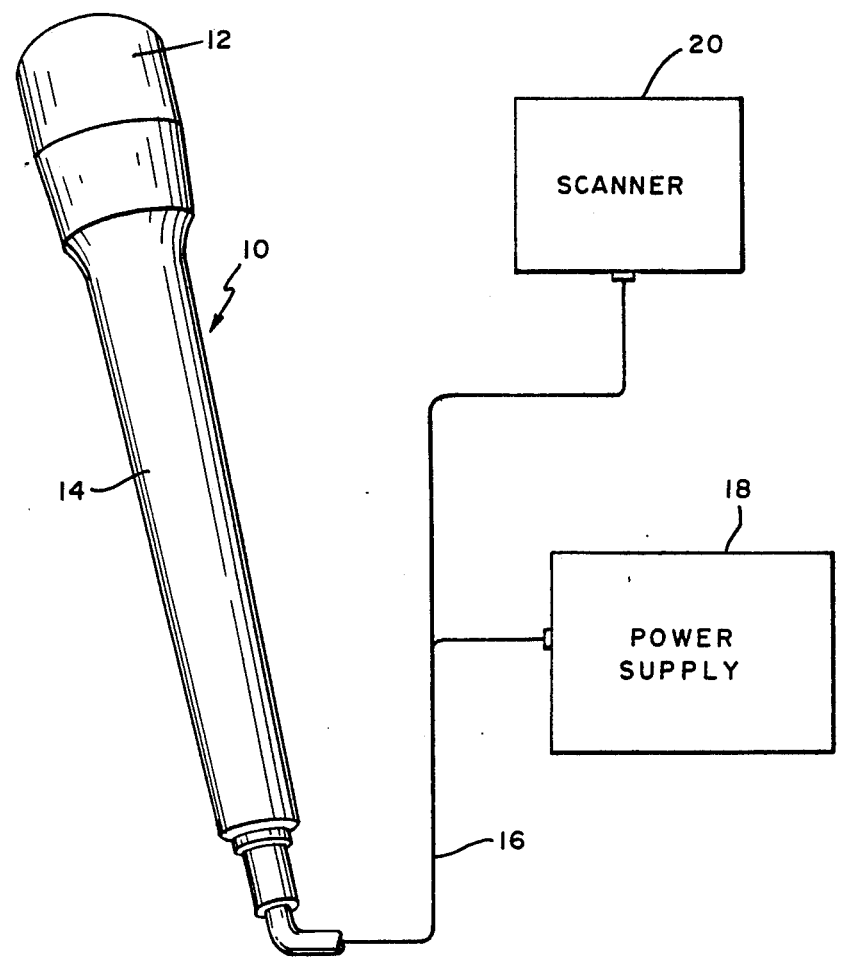
FIG. 1 is a perspective view of the transducer probe and motor assembly.

Referring now to the figures and to FIG. 1 in particular, there is shown a transducer probe assembly 10 comprising a transducer head assembly 12 and a handle 14 which encloses a linear reciprocating motor. A transmit-receive crystal and the four-bar linkage mechanism coupling the crystal to the motor are contained within the transducer head assembly 12.

As best seen in FIGS. 2 through 5, the transducer head assembly 12 includes an ultrasonic energy transmissive window provided by a polyethylene or polypropylene cap 22, coupled to the handle 14 and containing a non-ionic liquid, such as a Siloxane based oil, which acts as both a lubricant and ultrasound couplant.

An ultrasonic probe comprises a piezoelectric transmit-receive crystal 28 and a cylindrical crystal holder 30. Two laterally disposed pins 32 and 36 are mounted at the same height within the holder 30 near its bottom surface. A third pin 34 is disposed centrally between pins 32 and 36 at the same or at a different height within the holder 30. A cylindrical base 38 forming a support for the linkage mechanism also contains three pins. The first pin 40 passes through the longitudinal axis of the base 38 at a location elevated from the lower end of the base 38. The second pin 42 and the third pin 44 are disposed equidistantly from the longitudinal axis of the base and are located near the bottom of the base 38.

The crystal holder 30 and the stationary base 38 are coupled to each other by means of two straight bar links 46 and 48. Straight bar link 46 is pivotally connected with one end to pin 32 in the holder 30 (indicated as "A") and is pivotally connected at its other end to pin 42 in the base 38 (indicated as "C"). Straight bar link 48 is pivotally connected with one end to pin 36 of the holder 30 (indicated as "B") and is pivotally connected at its other end to pin 44 contained within the base 38 (indicated at "D"). The distance between the movable pivots "A" and "B" secured to the crystal holder 30, the distance between stationary pivots "C" and "D" contained within the base 38, and the lengths of the bar links 46 and 48 determine the pivotal swinging motion of the crystal 28. The base 38 is fixedly disposed inside of the upper portion of the handle 14. Therefore, the pins 32 and 36 are movable with respect to the handle 14 and the pins 42 and 44 are fixed in relation to the handle 14.

An L-shaped drive bar 50 is pivotally connected at one end to pin 34 in holder 30 (indicated as "E") and is pivotally connected to the base 38 along a pin 40 (indicated as "F"). The location of pin 34 is selected to be centrally disposed between the pins 32 and 36. The pin 40 by virtue of its dimension is adapted to flex and on account of the geometric configuration of the pins 32, 34 and 36, and the location of the pivot location F along pin 40, the pivot location E will travel in a nearly circular path around pivot location F. Pivotally connected at the other end of the drive bar 50 is one end of crank 52. The other end of crank 52 (indicated as "H") is connected by a suitable connection to the motor means, as described below, for driving the crystal holder 30 through an almost circular arc.

Referring to FIG. 2, when the crystal transmits ultrasonic search signals in a direction parallel to the axis of the transducer probe 10, the drive bar 50 portion spanning pivot locations E and F is disposed substantially parallel to the longitudinal axis of the probe assembly 10. As point H moves upward, bar 46 approaches a position parallel to the longitudinal axis of the probe assembly as shown in FIG. 3 where the bar 46 impacts a rubber bumper 26 located peripherally on the inside of the cap 22. When the motor means causes the location H to move in the other direction, downward motion, bar 48 approaches a position parallel to the longitudinal axis of the probe assembly as shown in FIG. 4 where the bar 48 impacts upon the rubber bumper 26. As location H travels between its extreme vertical positions, the axis of the ultrasound beams from the crystal 28 rotates about a small region at a distance in front of cap 22 responsive to the crystal holder swinging from the end position shown in FIG. 3 to the other end position per FIG. 4. The beams fan out from the rotation location to image the object being examined. If the region of rotation is between the ribs, in the intercostal region, an examination of the heart may be performed.

The pivot location E within the holder 30 will travel in an almost circular path around pivot location F. Pin 40 must be flexible to prevent a locking of the crystal holder 30. The ultrasonic search beam transmitted from crystal 28 rotates through the center region of the cap 22 indicated by L. By suitably selecting the length of the bars 46 and 48 and the distance between pins 32 and 36 in the holder 30 and the distance between pins 42 and 44 in the base 38, the region of intersection of the beams emanating from the crystal 28 can be placed at a predetermined distance in front of the probe assembly 10. This region of intersection is preferably placed sufficiently far in front of the probe assembly to be disposed between the costal cartilage of a patient.

Moreover, the relationship between the angle between the bar 50 and the ultrasonic beam angle relative to the longitudinal axis of the probe assembly 10 is nearly linear if the bars are suitably dimensioned. But in any case, the relationship between these angles follows a known relationship depending upon the bar dimensions selected. Therefore, the angle of the transmitted ultrasound beam may be determined by selecting the length of the linkages and location of the pivotal points. Given this condition it follows that, by sensing the position of the drive bar 50 portion between pivot locations E and F, the ultrasound beam angle is known.

As the crystal holder 30 swings about the movable pivot location F, the ultrasonic beam from the crystal 28 is directed through the region L toward the patient's intercostal region. FIG. 5 is a side view of the head assembly 12 and shows additional details of the links and mounting thereof.

Figure 6:
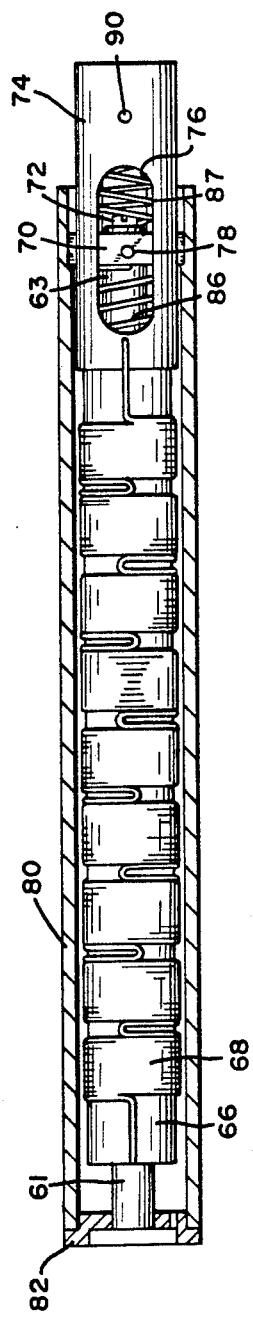
FIG. 6 is a sectional view of the motor.
Figure 7:
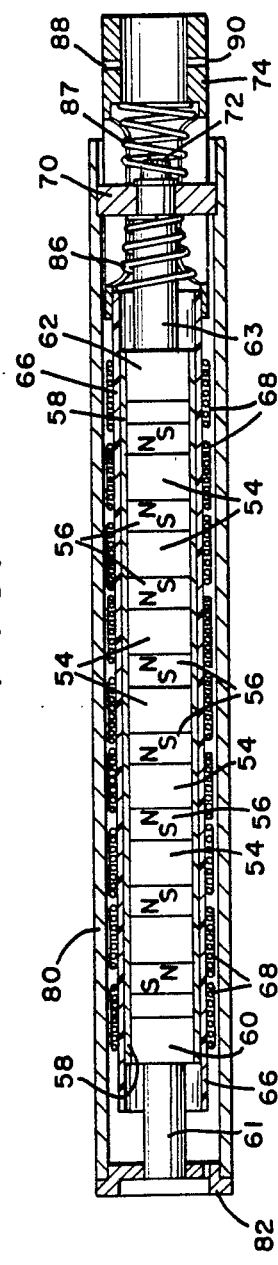
FIG. 7 is a view of the motor partially in section.

The motor means, shown in FIGS. 6 and 7, comprises a stack of spaced apart disk shaped samarian cobalt iron magnets 56 having like poles of pairs of magnets facing each other. Between each pair of magnets 56 there is a disk shaped mild steel spacer 54. The stack of magnets 56 and spacers 54 is contained in a non-magnetic cylindrical casing 58, such as austenitic stainless steel. An end piece 70 terminating in shaft 61 closes a first end of the casing 58, and a second end piece 62 terminating in shaft 63 having a centrally disposed tapped hole, closes the other end of the casing 58. The magnets 56, spacers 54 and end pieces 60 and 62 are bonded together, for example with epoxy, inside the casing 58. A cylindrical coil form 66 is disposed concentrically over the casing 58. One end of a slotted spider guide 74 is securely bonded to an end of the coil form 66. The other end of the guide 74 includes a pair of diametrically disposed apertures 88 and 90 for receiving a cotter pin 92 therethrough (see FIG. 8). Along the length of the coil form 66 there is disposed a plurality of electrical coil windings 68 axially located at positions opposite the spacers 54. The coil windings 68 are serially connected with adjacent coil windings 68 being wound in the opposite direction. A three pronged spider 70 is disposed inside the guide 74 with the prongs extending through slots 76 in the spider guide 74. The spider 70 is fastened to the end of shaft 63 by suitable screw means 72. In the end of at least one prong of the spider 70 is a tapped screw hole 78. A tube of magnetically permeable steel 80 (e.g. type SAE1020 steel) having a pair of longitudinal grooves is concentrically disposed over the coil form 66, coils 68 and a major part of the spider guide slot 76 as best seen in FIG. 6. An end cap 82 having a central aperture for receiving shaft 61 therein and at least one other aperture for allowing conductors from the electrical coils 68 to pass therethrough is press-fitted in the end of the tube 80 for centering the shaft 61 inside the tube 80. Near the other end of the tube 80 is a tapped screw hole (not shown). A screw (not shown) passing through this screw hole is fastened to a prong of spider 70 via tapped hole 78 for retaining the spider 70 and hence the magnet assembly stationary with respect to the tube 80 during operation. Two compression springs 86, 87 which are disposed on either side of the spider 70, inside the spider guide 74, center the coil form 66 and the spider guide 74 in the center of their permissible stroke.

In order to complete assembly of the transducer probe, the end of the crank 52 is placed within the spider guide 74 and a cotter pin 92, see FIGS. 5 and 8, is placed through the apertures 88 and 90 in the guide 74 and the end of crank 52 at location H. When in operation, the coil form 66 and hence the spider guide 74, the cotter pin 92 and the end of crank 52 undergo linear reciprocating motion in a direction parallel to the longitudinal axis of the stationary magnet stack. The motion of the spider guide 74 moves point H on crank 52 back and forth for causing the crystal holder 30 and crystal 28 to undergo a swinging motion as will be described.

The spider guide 74, and hence, the end of a crank 52 undergo the same motion. In one embodiment of the motor means using an eight stage, 6 mm diameter magnet of 2.5 mm length, the crank 52 at location H undergoes motion of up to 4 mm peak-to-peak displacement. In an alternative embodiment, a three stage 13 mm diameter, 5 mm long magnets were used. It is possible to provide a force on the compression springs in the range between 500 grams per ampere to 2 kilograms per ampere to drive the crystal and crystal holder. By selecting the size and quantity of magnets and coils the desired force per unit current at the desired operating frequency is obtained.

The motor is held inside the handle 14 by means of a pair of set screws passing through the handle into the tube 80. Hence, the motor and head assembly are held fixed in relation to the transducer handle. The entire transducer probe assembly is filled with a non-ionic liquid. By filling the entire assembly with this liquid the need for sealing the head assembly with a moving seal is obviated. The fluid fills the entire assembly for lubrication, for removing heat from the motor, and for coupling the ultrasound beam from the crystal 28 to the ultrasonic energy transmissive window.

An electrical signal provided from power supply 18, FIG. 1, via cable 16 to the ends of the serially connected and oppositely wound coils 68 disposed on coil form 66 creates magnetic fields as shown in FIG. 9. The flux as shown by the paths 100 in FIG. 9 travels through the individual magnets 56, the spacers 54 and the outer magnetic tube 80. By virtue of the direction of the respective windings of the coils 68 and the polarity of the magnets 56, an additive force is applied in a direction parallel to the longitudinal axis. Responsive to the quantity of magnets and coils, the force per unit current may be adjusted to any desired value. By suitably selecting the quantity of coils, a ratio of coil mass to force can be obtained which enables operation at 60 Hz. The frequency of the electrical signal used to energize the coils 68 may range from DC to approximately 60 Hz. As the polarity of the alternating current electrical signal changes, the force produced by coils 68 changes direction, causing the coil form 66 to undergo linear reciprocating motion in a direction parallel to the longitudinal axis of the assembly.

In order to provide an image of the organ under examination and particularly for imaging using a CRT display, it is necessary to sense the position of the crystal holder 30. To this end, a sensing coil (not shown) having an air gap is mounted in proximity to the drive bar 50 in the region between pivot locations E and F. Attached to the drive bar 50 is a piece of metal which enters the air gap of the sensing coil and changes the impedance of the sensing coil as a function of position of the bar 50. A 100 kHz electrical signal is fed through this sensing coil and the impedance of the coil is measured to determine the position of the bar 50 which is related to the scan angle of the ultrasonic beam. A signal indicative of the measured inductance is provided also to the sweep circuitry in the ultrasound scanner for aligning the sweep line on the CRT with the crystal holder 30 position. The electrical conductors to the sensing coil are disposed in one of the grooves in the outer surface of tube 80. The sensing coil construction and the use of such a coil to determine crystal position is well known in the art.

It is also possible to stop the scan and maintain the crystal 28 at a fixed position by applying a direct current electrical signal to the coils 68. The coil form 66 responsive to the application of a direct current electrical signal to the coils will develop a steady force compressing the spring 86 or 87 to move the coil form 66 to a position in direct relation to the applied direct current electrical current. The signal from the sensing coil is compared to the direct current electrical signal in order to maintain the desired angular position of the crystal holder 30.

In addition to the sensing coil conductors and power leads to the coil windings of the linear motor, the conductors connected to the crystal 28 are contained in cable 16.

Operation of the Probe

A low frequency electrical signal is provided from power supply 18 to excite the coils 68. The alternating current signal, as described above, causes the coils 68, coil form 66 and spider guide 74 to undergo linear reciprocating motion in a direction parallel to the longitudinal axis of the transducer assembly. As the spider guide 74 undergoes reciprocating motion, the lower end of crank 52 is driven in pivotal motion about pin 92. The motion of crank 52 causes the drive bar 50 to pivot about location F, thereby driving the crystal holder 30 at location E in an almost circular path about movable pivot location F. In order to prevent locking of the linkage system, pivot location F is movable by virtue of the pin 40 being dimensioned to flex. It is the flexure at pivot location F which causes pivot location E to travel in an almost circular path, instead of traveling in a purely circular path. Moreover, bumper 26 is provided peripherally around the inside of the cap 22 and prevents the bars 46 and 48 from becoming locked at the end of their motion range.

Concurrently with the crystal 28 undergoing its swinging motion, a 100 kHz excitation signal is provided to the sensing coil. The signal is measured to determine the inductance of the coil and hence, the angular position of the crystal holder 30. Since a 100 kHz electrical signal is used, the position indication is performed rapidly and the information is fed to the deflection (sweep) circuits of the display in the ultrasound scanner 18 for causing the sector scan display to be synchronized with the crystal holder position.

In a preferred embodiment, the motor is excited by an electrical signal having a frequency of 30 Hz for causing the ultrasound scanner beam to scan at a 30 Hz rate thereby providing a display at a rate of 60 scans per second to avoid flicker.

Electrical signals from the ultrasound scanner 18 provide excitation signals to the crystal 28 for transmitting ultrasonic search pulses into the patient. The echo signals from the patient received by the crystal are provided to the ultrasound scanner 18 for processing and display in a known manner.

On account of the non-circular motion of the crystal 28 the water path length traveled by the ultrasound search signal is different for each position of the crystal 28. When the crystal is in the central position as in FIG. 2 the path length is shortest; at the extreme positions per FIGS. 3 and 4 the path length is longest. In order to assure an accurate display, a preprogrammed time correction signal is stored in the ultrasound scanner 18 and is provided to the sweep circuitry of the CRT to commence the scan when the echoes from the skin of the patient are to be received. The position of the crystal is determined from the sensing coil and provided to the storage of the preprogrammed correction signals.

While the linkages have been described and illustrated as flat bars, it will be obvious to those skilled in the art that links of other cross-section, such as tubular bars, may be used instead of the flat bars.

While there has been described a preferred embodiment of an ultrasonic transducer, it will be obvious to those skilled in the art that variations and modifications may be made without deviating from the broad scope of the invention which shall be limited solely by the scope of the appended claims.

What is claimed is:

1. An ultrasonic transducer comprising:
   an elongated handle enclosing a motor adapted to impart linear reciprocating motion, said motor including
   a plurality of magnets disposed so as to have like magnetic poles of adjacent magnets facing each other;
   a plurality of iron spacers, each being disposed between adjacent magnets, said magnets and spacers being disposed in a non-magnetic case for forming a stack;
   a coil form disposed concentrically over said stack of magnets and spacers;
   a plurality of serially connected oppositely wound electrical coil windings axially disposed along said coil form, each coil being located opposite a respective spacer;
   a magnetic case disposed concentrically around said stack, coil form and coil windings;
   means for securing said stack stationary with respect to said magnetic case, and
   electrical means coupled to said coil windings for providing an electrical current for energizing said windings thereby to cause said coil form and stack to undergo linear displacement relative to each other;
   a transducer head assembly having an ultrasonic energy transmissive window joined to said handle and enclosing a crystal holder containing a crystal adapted to transmit and receive ultrasonic energy through said window;
   a stationary base disposed in said head;
   mechanical linkage means coupling said crystal holder to said base, and
   drive means coupling said motor to said mechanical linkage means for causing said crystal holder and crystal, when driven by said motor, to undergo reciprocating swinging motion relative to said base for transmitting ultrasonic energy to and receiving echo signals from an object in front of said window in a sector scanning motion.

2. An ultrasonic transducer as set forth in claim 1, said crystal holder having three pins therein, one centrally disposed pin and two laterally disposed pins, said centrally disposed pin being at the same elevation or at a different elevation from said two laterally disposed pins, said base having three pins therein one centrally disposed pin and two laterally disposed pins said centrally disposed pin being at the same or different elevation as said two laterally disposed pins, said mechanical linkage means comprising:
   a pair of links, each link being pivotally connected at their respective ends to respective same sided laterally disposed pins in said crystal holder and said base;
   an L-shaped drive bar pivotally connected at one end to the centrally disposed pin in said crystal holder and pivotally mounted at the base of the L to the centrally disposed pin in said base, the other end of said L-shaped bar being coupled to said drive means.

3. An ultrasonic transducer probe as set forth in claim 2, said centrally disposed pin in said base being adapted to flex.

4. An ultrasonic transducer as set forth in claim 1, and further including sensing means for sensing the angular position of said crystal holder.

5. An ultrasonic transducer as set forth in claim 1, said electrical means comprising a power supply for providing an alternating current electrical signal to said electrical coil windings for causing said coil form and stack to undergo relative linear reciprocating motion.

6. An ultrasonic transducer as set forth in claim 1, said electrical means comprising a power supply for providing a direct current electrical signal to said electrical coil windings for causing said coil form and said stack to be displaced relative to each other.

7. An ultrasonic transducer as set forth in claim 1, including a spider guide bonded to one end of said coil form and a multi-pronged two sided spider disposed within said spider guide securely fastened to an end of said non-magnetic case, a first spring disposed between one side of said spider and said non-magnetic case and a second spring disposed on the other side of said spider within said spider guide.

8. An ultrasonic transducer as set forth in claim 1, said transducer being filled with a non-ionic fluid.

9. A motor adapted to impart linear motion comprising:
   a plurality of magnets disposed so as to have like magnetic poles of adjacent magnets facing each other;
   a plurality of iron spacers, each being disposed between adjacent magnets, said magnets and spacers being disposed in a non-magnetic case for forming a stack;
   a coil form disposed concentrically over said stack of magnets and spacers;

a plurality of serially connected oppositely wound electrical coil windings axially disposed along said coil form, each coil being located opposite a respective spacer;

a magnetic case disposed concentrically around said stack, coil form and coil windings;

means for securing said stack stationary with respect to said magnetic case, and electrical means coupled to said coil windings for providing an electrical current signal for energizing said windings thereby to cause said coil form and stack to undergo linear displacement relative to each other.

10. A motor as set forth in claim 9, said electrical means comprising a power supply for providing an alternating current electrical current signal to said electrical coil windings for causing said coil form and stack to undergo relative linear reciprocating motion.

11. A motor as set forth in claim 9, said electrical means comprising a power supply for providing a direct current electrical current signal to said electrical coil windings for causing said coil form and said stack to be displaced relative to each other.

12. A motor as set forth in claim 9, including a spider guide bonded to one end of said coil form and a multi-pronged two sided spider disposed within said spider guide securely fastened to an end of said non-magnetic case, a first spring disposed between one side of said spider and said non-magnetic case and a second spring disposed on the other side of said spider within said spider guide.

* * * * *